Aug. 4, 1931.  J. STANGLER  1,816,939
DETECTOR AGAINST HIT AND RUN DRIVERS
Filed Oct. 3, 1930  2 Sheets-Sheet 1
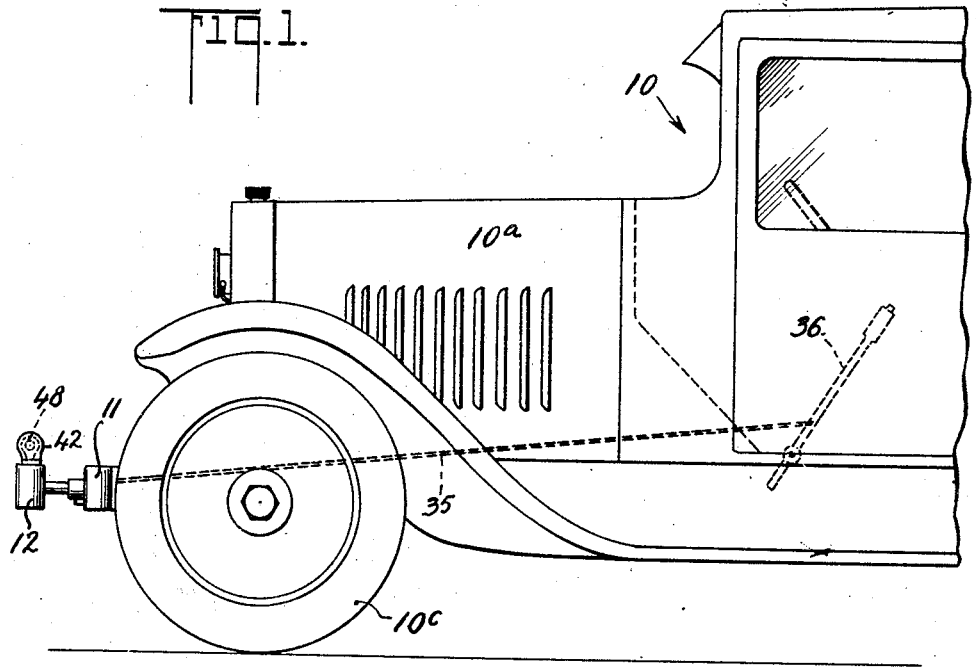
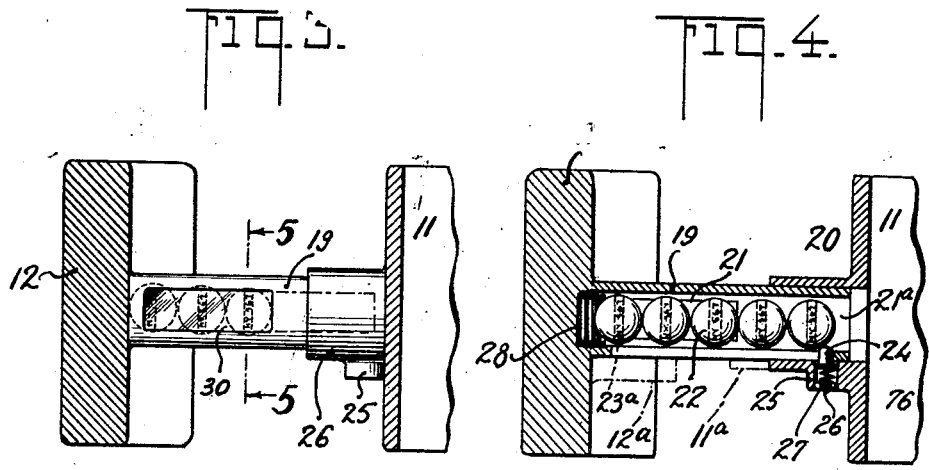
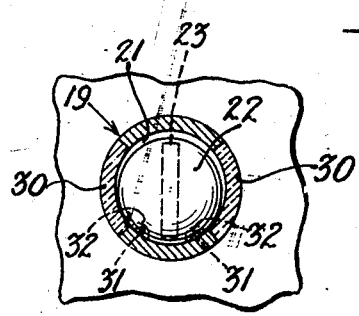
JACK STANGLER
INVENTOR
BY Victor J. Evans
ATTORNEY Aug. 4, 1931.  J. STANGLER  1,816,939
DETECTOR AGAINST HIT AND RUN DRIVERS
Filed Oct. 3, 1930  2 Sheets-Sheet 2
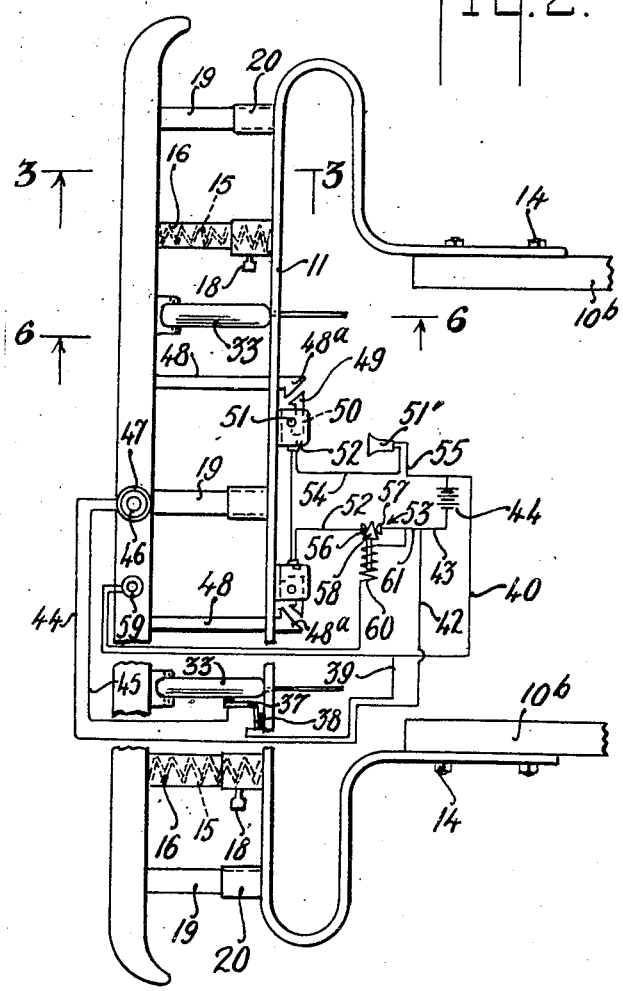
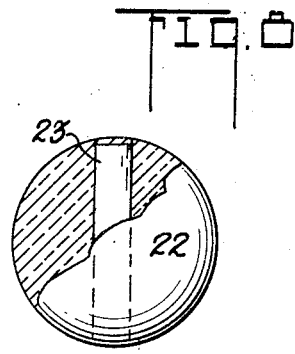
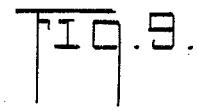
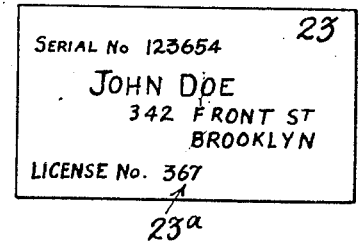
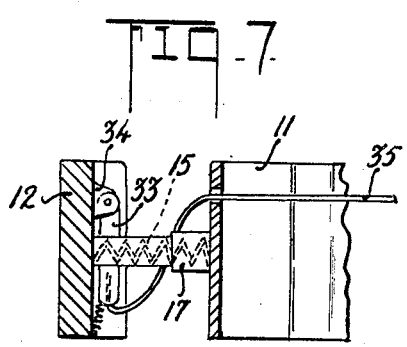
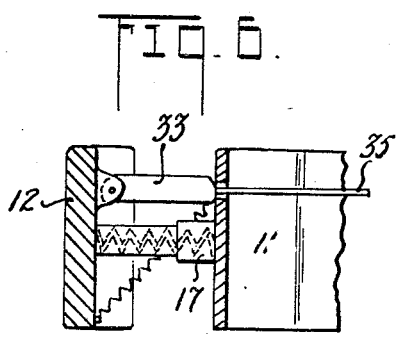
JACK STANGLER
INVENTOR
BY Victor J. Evans
ATTORNEY Patented Aug. 4, 1931

1,816,939

UNITED STATES PATENT OFFICE

JACK STANGLER, OF BROOKLYN, NEW YORK, ASSIGNOR OF FORTY-NINE ONE-HUNDREDTHS TO HERMAN MITKOFF, OF BROOKLYN, NEW YORK

DETECTOR AGAINST HIT AND RUN DRIVERS

Application filed October 3, 1930. Serial No. 486,260.

This invention relates to protective systems, methods and apparatus for detecting reckless automobilists, or so-called hit-and-run-drivers.

The modern development of transportation by automobile, either in pleasure vehicles, busses or taxi-cabs, for passengers, or for goods, wares and merchandise, in motor driven delivery wagons or trucks, has brought into existence certain difficulties and even menaces, particularly to pedestrians, and especially in places where children are liable to stray from the pavement and play at the middle of street in cities, or at the sides or middles of roadways in the country or semi-rural districts. A hit-and-run-driver, as is well known, is fairly frequently encountered; and probably in the future, such is human nature, he will be encountered ever much more frequently, if some means be not provided to render his punishment swift and sure,—to be more specific, some means for certainly and in every case detecting him, as by the number of his operator's license or the registration number of his car or both, following his driving of his automobile in such a way as to strike and injure a person, as a pedestrian or child playing in the street, and after he then flees from the scene of the accident. Humane automobilists, of course, immediately stop their cars at the scene of the accident, to see if, for instance, they can not be of assistance in immediately transporting the injured person to the nearest hospital; and, if the automobilist be honest as well as inclined to be humane, he will also stop at the scene of the accident in order to have himself identified so that later proper recompense may be made to the one injured or to the parents of the child suffering in the accident. The driver of the hit-and-run type, however, on the contrary, has but one thought, that is to be clear of the scene of the accident and well on his way at an unlawful speed, in time to prevent any bystander from having presence of mind enough to take the number of the license plate on the car. Oftentimes, of course, such an accident occurs in the night time and in a more or less a secluded spot, as in the open country or in a suburb of a city; but even so, the automobilist of the hit-and-run type usually puts his foot on the accelerator, and speeds away, to take no chances that his unlawful act will be ever discovered.

One of the objects of the present invention is to provide a system of identifying each automobilist, preferably by the same identifying number as his operator's license or the number plate of his car or both; and wherein said system involves an auxiliary mechanism for the vehicle such that a person may not be struck and injured thereby without absolutely certain tell-tale evidence of the perpetrator of the act, regardless of whether or not the number of his license plate is noted, or how rapidly he leaves the scene after the accident, and this, even in a case where his departure is so hastened that no bystander is able to make a record of the number of his license.

Another object of the invention is to provide an auxiliary structure as last described, in combination with one or more objects to be automatically discharged and left lying on the road or street, to serve as the identifying means for subsequently locating and apprehending the reckless driver; wherein, preferably, an attention attracting signal will be immediately given, such as a visual signal or an audible signal, and preferably the latter, so operating that usually a nearby citizen, or even one perhaps some distance removed from the scene of the accident, may be positively warned of the fact that the automobilist, now under way, probably at a high speed, has just been the cause of a serious accident, so that such citizen observing the speeding car may commandeer another automobile to chase and bring about the arrest of the offender.

Other objects and advantages of the invention will be hereinafter specifically pointed out, or will become apparent, as the specification proceeds.

With the above indicated objects in view, the invention resides in certain novel construction and combinations and arrangements of parts, clearly described in the following specification and fully illustrated in the accompanying drawings, which latter show embodiments of the invention as at present preferred.

In said drawings:

Fig. 1 is a side elevation showing a conventional type of passenger automobile, equipped with said embodiment;

Fig. 2 is a view in top plan, on an enlarged scale, showing said embodiment;

Fig. 3 is a vertical section, enlarged over the scale of Fig. 2, but taken on line 3—3 of Fig. 2;

Fig. 4 is a view similar to Fig. 3, but taken on line 4—4 of Fig. 2;

Fig. 5 is a transverse vertical section, still more greatly enlarged, taken on the line 5—5 of Fig. 3;

Fig. 6 is a transverse vertical section, taken on the line 6—6 of Fig. 2;

Fig. 7 is a view similar to Fig. 6, but showing the parts in different positions;

Fig. 8 is an elevational view, partially broken away and partially in section, of one of the aforesaid objects to be projected and left on the pavement or on the roadbed after an accident; and Fig. 9 is a view showing an identifying ticket or a slip or the like to be carried within the object illustrated in Fig. 8.

Similar reference characters refer to similar parts throughout the several views of the drawings.

Referring to the illustrative embodiment thus appearing in the drawings, there is shown, as an example of one of the possible ways of carrying out the invention, say a passenger automobile 10 having a conventional type of body 10a suitably mounted, as by the chassis frames 10b, on suitable running gear including said frames and road wheels 10c on axles or the like spring-hung or otherwise connected to the chassis.

As will be seen best from Figs. 1 and 2, a protuberant structure, in the present case a front bumper structure, is provided to include a rear part or support 11, and a forward part or striker 12. Such striker is the bumper proper, and is here shown shaped in a manner favored at present; while the support may for convenience be made of the familiar design shown, and constructed as a suitably bent spring metal bar having terminal portions bolted as at 14 to the chassis frames 10b.

This bumper or striker 12 is normally, during running of the vehicle, held yieldingly thrust forward, by coil springs 15 nested in telescopic sections 16 and 17 constituting means for mounting the striker in place and guiding the same for easy parallel movement back toward the bar or support 11 on the impact of said striker against an object, as a pedestrian or a playing child, in the path of forward travel of the vehicle. The cylinder defined by said telescopic sections may be packed with a suitable grease, and greasecups may be provided as indicated in 18 in Fig. 2.

Other telescopic sections 19 and 20 are present, also between the relatively movable parts 11 and 12 of the projecting protective structure, these to act as storage chambers 21 for devices 22 to be ejected on said relative movement occurring.

As seen clearly in the drawings, each of said devices 22 is a glass ball as here shown; but in any event, each such device is preferably generally spherical. When the device is as just described, and contains a carrier for the identifying indicia, with such indicia exposed when the carrier is housed in a suitable recess in the device, the part of the glass ball appearing between the eye of the beholder and said exposed indicia acts as a magnifying lens, thus permitting the indicia to be readily read and also easily read because magnified. Obviously, the device 22 may be otherwise shaped, but preferably it is substantially spherical, although it may have one or more flat sides, to minimize rolling after it strikes the ground. Also, said device may be made of some other material, and be provided with a peep opening therein, either open or covered over with a lens or pane of transparent material, so that through the opening said indicia may be readily read.

In the present case, the carrier just referred to is a sheet of paper or the like, rather small, as shown in Fig. 9, and on which is written or inscribed the name and address of the driver or owner of the car, his license number, and, if desired, or, in the alternative, a special serial number or equivalent. This carrier is marked 23, and may be of such a shape and flexibility that the same may be rolled up, in the present case, along its longer sides, so as to expose along a longitudinal edge, when finally rolled up, a selected identifying number or the like. This is clearly shown in Fig. 4, wherein the indicium 23a, in the present case the license number, is plainly seen.

It is at present preferred to discharge a plurality, and indeed quite a large multitude, of the devices 22, on the occurrence of an accident. Thus, there are three sets of telescopic sections 19 and 20; and, as shown in Figs. 3 and 4, there are five devices 22 in each chamber 21 within these sections. Should it be desired, on the other hand, to discharge a lesser number of devices 22 than is fully stored in the apparatus, a suitable stop means may be provided in any suitable way; as, for instance, indicated in broken lines at 12a and 11a in Fig. 4. According to the design of said parts last referred to, the movement between the striker 12 and the support 11, on the occurrence of an accident, would only be sufficient to eject from each of the chambers 21 one of the devices 22.

In order that the devices may be securely held in their appointed chambers 21, during ordinary running of the automobile and normally encountered road vibrations, and yet so that the one or more of said devices 22 intended may be ejected from their chamber or chambers on the occurrence of an accident, an impositive detent means is provided as shown in the views last mentioned, including a round-headed plunger 24, movable endwise along the length of a cylindrical recess 25, having therein a coil spring 26, adjusted by a female nut 27, for normally urging the plunger 24 to the position illustrated.

Said plunger's head is rounded all over, preferably, so that the ejection opening 21a for the chamber 21 may also serve as an insertion or ingress opening for feeding the devices 22 into their appointed chamber 21. Thus, an inspector of police, or an agent of the motor vehicle department, may readily, when he has stopped an automobilist to check the working order of the apparatus of the present invention, eject all the devices 22 for examination, and then, practically as easily, restore all said devices to their appointed chambers 21, merely by thrusting them one by one, into the proper openings 21a, from in rear of support 11.

In aid of the operation of the parts as intended, particularly for the automatic ejection of one or more devices 22, each chamber 21, as shown in Fig. 4, at its forward end, and housed therein an expansile of spring 28, against which the forward device 22 is pressed when the chamber 21 is filled with the devices as shown in said Fig. 4.

As a desirable and preferred feature of the present invention, the following parts are provided to facilitate the work of a police inspector or an agent of the motor vehicle bureau or the like: As shown most clearly in Fig. 3, with cross-reference to Fig. 5, the section 19 forming part of the bounding walls of each chamber 21, at its side, may have a peep opening 29 desirably covered over by a transparent pane 30. As shown in Fig. 5, such pane 30 is duplicated on opposite sides of said section 19. As is also preferred, all the panes thus employed at 30 or in equivalent locations are made of shatter-proof glass.

Still referring primarily to Fig. 5, another feature which it may be desirable to employ is indicated in broken lines at 31 and 32. The elements 31 are longitudinal ribs running lengthwise of the bottom of the inner surface of section 19; while the elements 32 are grooves formed across the intended bottoms of the devices 22 as they normally are resting in the intended fashion in their chambers 21. Such an arrangement will insure that until they are ejected said devices 22 will always remain in their chambers 21 in such positions that the intended indicia 23a on the carriers 23 therein, may be viewed, through the sides of the chambers 21. Thus, an inspector of the kind above referred to, may check up the fact that devices 22 do not carry false and misleading indicia, without removing said devices from their chambers.

In order that the parts may be set, so that no mischievous child or other person may relatively move the striker 12 and the support 11, to eject one or more of the devices 22, while the automobile is stopped, say parked at the curb, the following parts are provided: Referring to Figs. 2, 6 and 7, one or more weighted bars 33 are pivotally hung on lugs 34 on the rear portion of striker 12, in such manner that the weight of the bars normally drops them to vertical position as shown in Fig. 7. These bars are such lengths that when they are elevated toward the horizontal position shown in Fig. 6, there can be no relative movement between striker 12 and support 11 sufficient to eject any device 22. In order thus to elevate such bars when desired by the driver of the vehicle, cables 35 or the like are extended to the driver's compartment and connected, as shown best in Fig. 1, to the emergency brake lever indicated at 36. Thus, when the car is stopped, and as usual such lever is pulled to put on the emergency brakes, the cables 35 are automatically pulled to lock the parts 12 and 11 against relative movement.

However, it must always be remembered that the type of driver who ordinarily would be a hit-and-run driver, is capable of all sorts of unlawful expedients, to avoid being charged with the results of his later possible misdoings. Therefore, it is conceivable that he would disconnect the cables 35 from the brake lever 36; or it might be that he would disconnect from said lever the brake actuating connections, and prefer to depend on his ordinary foot brakes, rather than take the chance of being later apprehended for an accident. Further, it may be desired to use the apparatus of the present invention in connection with a special lever or equivalent (not shown), but independent of the emergency brake lever. In view of all the foregoing, it is preferred, although not essential, to employ as a feature of the invention, a means like or equivalent to that now to be described. See now Fig. 1 and 2. A selected one of the bars 33 carries, insulated therefrom as indicated, one member of a pair of contacts 37 and 38. The other contact of this pair, 38, is mounted, and also similarly insulated, on support 11. These contacts are so arranged that unless the bar 33 is in the position indicated in Figs. 2 and 6, the contacts are away from each other. Contact 38 leads by a wire 39 to a wire 40 and then to a battery or other suitable source of electric current as indicated at 41. The other contact leads by a wire 42 to a wire 43 and then to the other pole of said battery or the like. Interposed in the wire 42, however, as by wires 44 and 45, is an electric light bulb 46. This bulb 46 is inside of a preferably tamper-proof casing 47, secured to striker 12, this casing having one or more beam discharging lens or the like 48. It will be clear that whenever the bars 33 are lifted to the position shown in Fig. 6, by any means, thereby to prevent relative movement between striker 12 and support 11, a visual alarm readily noted by any officer of the police or any citizen will be emitted from the casing 48, preferably in a plurality of directions. When the car is caught or otherwise stopped, the glowing of such light will not be heeded in any way, as it will then be quite proper; but should such light ever show itself during running of the automobile, a warning will be given that the driver is attempting to evade the law which it is hoped will be passed to provide that every automobilist must have his vehicle equipped with an apparatus meeting the general objects of the present invention, and incorporating a feature such as the one now being described.

Next there will be referred to a feature of the present invention which is now deemed is of the utmost importance, in combination with the feature of the invention whereby the devices 22 or equivalents are discharged on the roadway on occurrence of an accident. Referring particularly to Fig. 2, note that striker 12 has rigidly rearwardly projecting therefrom one or more rods 48 having ramped heads 48a to act as cam-noses relative to similarly shaped slide pieces 49 slidable in guiding casings 50, these casings secured to the rear portion of support 11. As by springs 51, the members 49 are normally held in the positions illustrated. Immediately on such members 49 being moved toward each other, however, by action of the cams 48a, following a relative movement between striker 12 and support 11 sufficient to eject one or more devices 22, the inner ends of said members 49 engage and close switches 52. Thereby, immediately, a circuit is closed including the battery or other source of current 41, the conductor 43, and other conductors 52, 53, 54 and 55, interposed between which last two conductors is a siren 55 of the electric current operating type. Inasmuch as the contacts 56 and 57 associated with the conductors 52 and 53 are normally closed by a bridge member 58, any such actuation of the members 49 as above described, will instantly cause screaming of the siren and a continuation thereof without stop. This sounding of the siren will continue as long as the driver is speeding away from the scene of a hit-and-run accident, since the only way it is possible for him, according to the embodiment of the invention shown, to cease the siren, is to stop the car, alight therefrom, run around the front of the car, and press the button of the switch indicated at 59. This switch is here shown as the conventional push-button type, but of course may be any design of switch, and anywhere located. In the present case, it is shown as mounted on the striker 12. Operation of this switch causes the siren to cease its sounding, in view of the following parts: The bridge piece 58 is the terminal portion of the movable armature of a solenoid 60, actuated by the battery or other source of current 41 due to the conductor 40, already mentioned, and a conductor 61 leading to the above-mentioned conductor 53.

The hereinbefore described construction admits of considerable modification without departing from the invention; therefore, it is the wish not to be limited to the precise arrangements shown and described, which are as aforesaid, by way of illustration merely. In other words the scope of protection contemplated is to be taken solely from the appended claims, interpreted as broadly as is consistent with the prior art.

I claim:

1. A protective system of the kind described, including the combination, with the running gear of a vehicle, of a structure carried by said gear and protuberant in a direction of travel of said vehicle; said structure including relatively movable parts of which one, hereinafter called the striker, is positioned ahead of the other in said direction; means operable during travel of the vehicle for yieldingly holding said structure projected to a certain position; and means operable, on said striker being forced to a position of less projection due to its impact against an object in said path, to give a plurality of abnormal signals, one visual and deposited on the ground in the vicinity of such impact, and the other audible and carried away from such vicinity with the vehicle.

2. A protective system of the kind described, including the combination, with the running gear of a vehicle, of a structure carried by said gear and protuberant in a direction of travel of said vehicle; said structure including relatively movable parts of which one, hereinafter called the striker, is positioned ahead of the other in said direction; means operable during travel of the vehicle for yieldingly holding said structure projected to a certain position; means operable, on said striker being forced to a position of less projection due to its impact against an object in said path, to give an abnormal signal carried with the vehicle away from the vicinity of such impact; latching means to continue said signal until the means next mentioned is operated; and means for ceasing operation of said signal but operable by an occupant of the vehicle only after stoppage of the vehicle, said ceasing means including an actuator inaccessible to said occupant until the driven of the vehicle has stopped the same and an occupant thereof has alighted from the vehicle and thereby moved a part of his body a greater distance than a part of his body would have to be moved to attain the same purpose while said occupant was still inside the vehicle.

3. The system defined in claim 1, wherein latching means and releasing means are provided, said latching means to continue said audible signal until the means next mentioned is operated, said releasing means including an actuator inaccessible to an occupant of the vehicle until the driver of the vehicle has stopped the same and an occupant thereof has aligned from the vehicle and thereby moved a part of his body a greater distance than a part of his body would have to be moved to operate said actuator while said occupant was still inside the vehicle.

4. A protective system of the kind described, including the combination, with the running gear of a vehicle, of a structure carried by said gear and protuberant in a direction of travel of said vehicle; said structure including relatively movable parts of which one, hereinafter called the striker, is positioned ahead of the other in said direction; means operable during travel of the vehicle for yieldingly holding said structure projected to a certain position; and means for normally storing an identifying device, said device including a housing carrying and protecting against the weather an indicium identifying a person liable for injuries to others during operation of the vehicle, means operated by a movement of said striker to a position of less projection, for ejecting said device to deposit the same on the ground in the vicinity of such impact, said housing being of sufficient weight to insure against inadvertent departure thereof from such vicinity, and means operable at will from within the vehicle, to positively hold said striker in its first-mentioned position during stoppage of the vehicle.

5. A protective system of the kind described, including the combination, with the running gear of a vehicle, of a structure carried by said gear and protuberant in a direction of travel of said vehicle; said structure including relatively movable parts of which one, hereinafter called the striker, is positioned ahead of the other in said direction; means operable during travel of the vehicle for yieldingly holding said structure projected to a certain position; and means for normally storing an identifying device, said device including a housing carrying and protecting against the weather an indicium identifying a person liable for injuries to others during operation of the vehicle, means operated by a movement of said striker to a position of less projection, for ejecting said device to deposit the same on the ground in the vicinity of such impact, said housing being of sufficient weight to insure against inadvertent departure thereof from such vicinity, means operable at will from within the vehicle, to positively hold said striker in its first-mentioned position during stoppage of the vehicle, and means for giving an abnormal signal while said positively holding means is functioning.

6. A protective system of the kind described, including the combination, with the running gear of a vehicle, of a structure carried by said gear and protuberant in a direction of travel of said vehicle; said structure including relatively movable parts of which one, hereinafter called the striker, is positioned ahead of the other in said direction; means operable during travel of the vehicle for yieldingly holding said structure projected to a certain position; means operable, on said striker being forced to a position of less projection due to its impact against an object in said path, to give an abnormal signal; and means, operable at will from within the vehicle, to positively hold said striker in its first-mentioned position, during stoppage of the vehicle as in parking.

7. The system defined in claim 6, wherein means are provided for automatically giving a different signal while said positively holding means is functioning.

8. A protective system of the kind described, including the combination, with the running gear of a vehicle, of a structure carried by said gear and protuberant in a direction of travel of said vehicle; said structure including relatively movable parts of which one, hereinafter called the striker, is positioned ahead of the other in said direction; means operable during travel of the vehicle for yieldingly holding said structure projected to a certain position; and means for normally storing an identifying device, said device including a housing carrying and protecting against the weather an indicium identifying a person liable for injuries to others during operation of the vehicle, means operated by a movement of said striker to a position of less projection, for ejecting said device to deposit the same on the ground in the vicinity of such impact, said housing being of sufficient weight to insure against inadvertent departure thereof from such vicinity, said housing being a sealed container, provided with a peep opening through which a contained element may be viewed, and a carrier for said indicium constituting said contained element.

9. A protective system of the kind described, including the combination, with the running gear of a vehicle, of a structure carried by said gear and protuberant in a direction of travel of said vehicle; said structure including relatively movable parts of which one, hereinafter called the striker, is positioned ahead of the other in said direction; means operable during travel of the vehicle for yieldingly holding said structure projected to a certain position; and means for normally storing an identifying device, said device including a housing carrying and protecting against the weather an indicium identifying a person liable for injuries to others during operation of the vehicle, means operated by a movement of said striker to a position of less projection, for ejecting said device to deposit the same on the ground in the vicinity of such impact, said housing being of sufficient weight to insure against inadvertent departure thereof from such vicinity, said housing being a sealed container, provided with a peep opening through which a contained element may be viewed, and a carrier for said indicium constituting said contained element, said carrier being so positioned in said container that the indicium thereon may be viewed through said peep opening.

10. A protective system of the kind described, including the combination, with the running gear of a vehicle, of a structure carried by said gear and protuberant in a direction of travel of said vehicle; said structure including relatively movable parts of which one, hereinafter called the striker, is positioned ahead of the other in said direction; means operable during travel of the vehicle for yieldingly holding said structure projected to a certain position; and means for normally storing an identifying device, said device including a housing carrying and protecting against the weather an indicium identifying a person liable for injuries to others during operation of the vehicle, means operated by a movement of said striker to a position of less projection, for ejecting said device to deposit the same on the ground in the vicinity of such impact, said housing being of sufficient weight to insure against inadvertent departure thereof from such vicinity, said housing being a sealed container, provided with a peep opening through which a contained element may be viewed, and a carrier for said indicium constituting said contained element; said carrier being so positioned in said container that the indicium thereon may be viewed through said peep opening; said storage means including a chamber having a peep opening through which said housing therein and its indicium may be checked visually by an inspector.

11. A protective system of the kind described, including the combination, with the running gear of a vehicle, of a structure carried by said gear and protuberant in a direction of travel of said vehicle; said structure including relatively movable parts of which one, hereinafter called the striker, is positioned ahead of the other in said direction; means operable during travel of the vehicle for yieldingly holding said structure projected to a certain position; and means for normally storing an identifying device, said device including a housing carrying and protecting against the weather an indicium identifying a person liable for injuries to others during operation of the vehicle, means operated by a movement of said striker to a position of less projection, for ejecting said device to deposit the same on the ground in the vicinity of such impact, said housing being of sufficient weight to insure against inadvertent departure thereof from such vicinity, said housing being a sealed container, provided with a peep opening through which a contained element may be viewed, and a carrier for said indicium constituting said contained element; said carrier being so positioned in said container that the indicium thereon may be viewed through said peep opening; said storage means including a chamber having a peep opening through which the presence and correct character of said housing may be checked visually by an inspector; and a means partially carried by the interior of said chamber and partially carried by said container and functioning to maintain said container always in a certain position in said chamber relative to the peep opening of said chamber, before ejection of said device from said chamber.

12. The system defined in claim 1, wherein a chamber is provided between said striker and the other part of said protuberant structure for normally housing an ejectable device to constitute when ejected said visual signal, said chamber having an ingress and egress opening for said device, and there being associated with said opening a means including an impositive detent functioning relative to a device being ejected from said chamber and also relative to a device being inserted into said chamber.

13. A protective system of the kind described, including the combination, with the running gear of a vehicle, of a structure carried by said gear and protuberant in a direction of travel of said vehicle; said structure including relatively movable parts of which one, hereinafter called the striker, is positioned ahead of the other in said direction; means operable during travel of the vehicle for yieldingly holding said structure projected to a certain position; and means for normally storing an identifying device, said device including a housing carrying and protecting against the weather an indicium identifying a person liable for injuries to others during operation of the vehicle, means operated by a movement of said striker to a position of less projection, for ejecting said device to deposit the same on the ground in the vicinity of such impact, said housing being of sufficient weight to insure against inadvertent departure thereof from such vicinity, said housing having an ingress and egress opening for said device, and means associated with said opening including an impositive detent functioning relative to a device being ejected from said chamber and also relative to a device being inserted into said chamber.

In testimony whereof I hereby affix my signature.

JACK STANGLER.